(12) United States Patent
Gao et al.

(10) Patent No.: US 11,401,629 B2
(45) Date of Patent: Aug. 2, 2022

(54) NANOFIBERS AND PREPARATION METHODS THEREFOR

(71) Applicant: ZHEJIANG UNIVERSITY, Hangzhou (CN)

(72) Inventors: Chao Gao, Hangzhou (CN); Jiaqing Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/608,989

(22) PCT Filed: Nov. 13, 2020

(86) PCT No.: PCT/CN2020/128500
§ 371 (c)(1),
(2) Date: Nov. 5, 2021

(87) PCT Pub. No.: WO2022/099570
PCT Pub. Date: May 19, 2022

(65) Prior Publication Data
US 2022/0213620 A1    Jul. 7, 2022

(51) Int. Cl.
*D01D 1/02* (2006.01)
*D01D 10/02* (2006.01)
(Continued)

(52) U.S. Cl.
CPC ............... *D01F 9/21* (2013.01); *D01D 5/003* (2013.01); *D01D 5/0038* (2013.01); *C01B 32/192* (2017.08); *C01B 32/198* (2017.08)

(58) Field of Classification Search
CPC ...... C01B 32/192; C01B 32/198; D01D 1/02; D01D 5/0038; D01D 5/0046; D01D 10/02;
(Continued)

(56) References Cited

FOREIGN PATENT DOCUMENTS

| CN | 105603582 A | 5/2016 | |
|---|---|---|---|
| CN | 105648579 A | 6/2016 | |
| CN | 110226968 A * | 9/2019 | .......... D06M 15/263 |

OTHER PUBLICATIONS

International Search Report issued in corresponding International application No. PCT/CN2020/128500, dated Jul. 26, 2021.
(Continued)

*Primary Examiner* — Leo B Tentoni

(57) ABSTRACT

The present invention discloses a method for preparing graphene nanofibers and non-woven fabrics using a fluid with a ultra-high draw ratio by means of a high-voltage electrospinning method. Compared with other methods for preparing graphene fibers (such as wet spinning, air-assisted spinning, etc.), the graphene fibers obtained by the present method have smaller diameters (about 100 nm to 500 nm) and a higher yield. The fibers themselves have better mechanical and electrical properties. The invention discloses a method for preparing ultra-fine graphene nanofibers and non-woven fabrics by electrospinning a mixed spinning liquid system of polymer and graphene oxide (the polymer is sodium polyacrylate). This method is highly efficient and environmentally friendly, and the resulted graphene nanofibers are the thinnest graphene fibers as currently known.

6 Claims, 7 Drawing Sheets

(51) Int. Cl.
        *D01F 11/06*      (2006.01)
        *D02J 13/00*      (2006.01)
        *D06M 11/13*      (2006.01)
        *D01F 9/21*       (2006.01)
        *D01D 5/00*       (2006.01)
        *C01B 32/192*     (2017.01)
        *C01B 32/198*     (2017.01)

(58) Field of Classification Search
        CPC . D01F 9/21; D01F 11/06; D02J 13/00; D06M 11/13
        USPC ........... 264/29.2, 29.6, 29.7, 211.14, 211.15, 264/211.17, 465; 447/447.7, 447.8
        See application file for complete search history.

(56) References Cited

OTHER PUBLICATIONS

Written Opinion of the International Search Authority in corresponding International application No. PCT/CN2020/12850022, dated Jul. 26, 2021.
Shi,Q. W.et al..A remote controllable fiber-typenear-infrared light-responsive actuator Chem.Commun. May 31, 2017 (May 31, 2017), ISSN 1359-7345, p. 2, left col. paragraph 1.

* cited by examiner

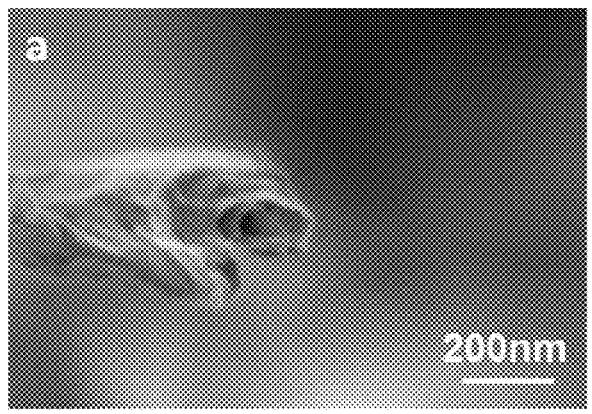 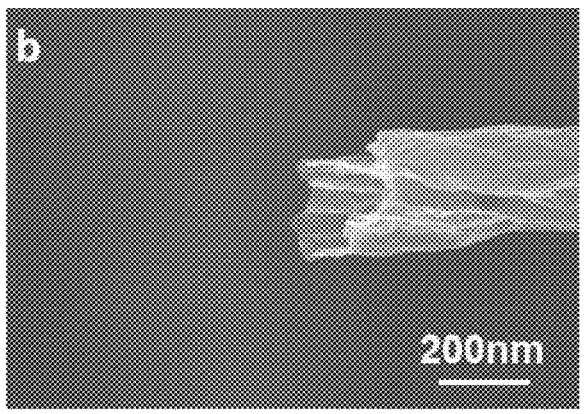
FIG. 12a　　　　　　　　　FIG. 12b
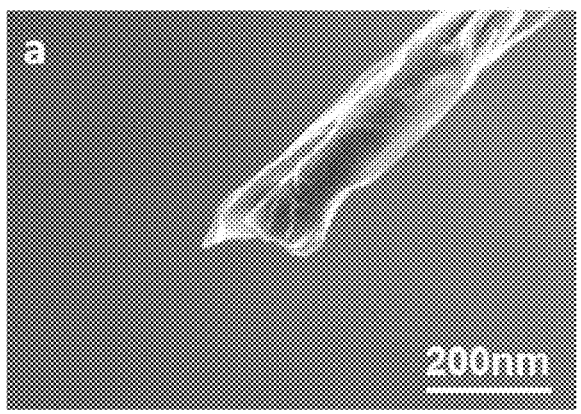 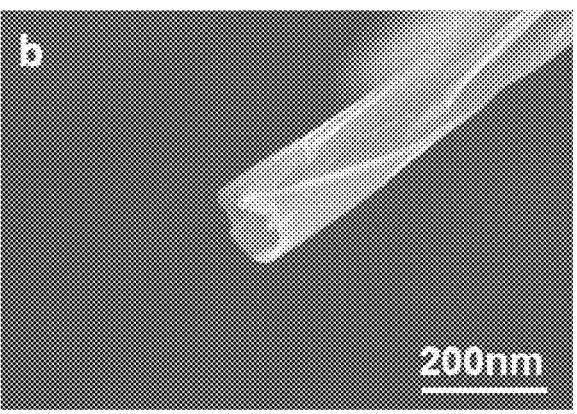
FIG. 13a　　　　　　　　　FIG. 13b
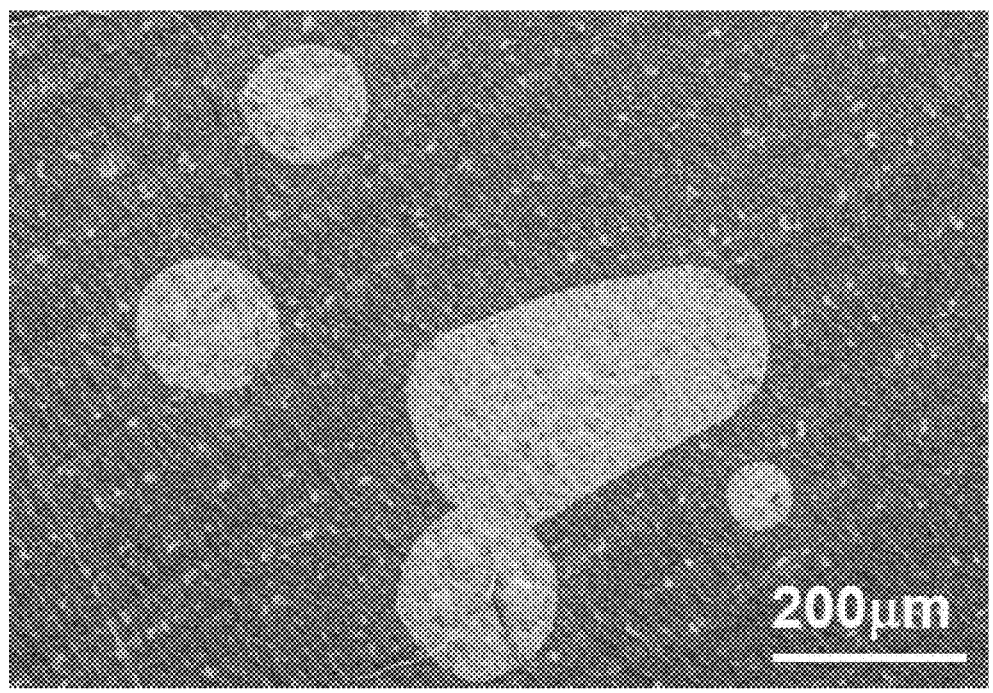
FIG. 14

NANOFIBERS AND PREPARATION METHODS THEREFOR

TECHNICAL FIELD

The present invention relates to graphene materials, in particular, to nanofibers and preparation methods therefor.

BACKGROUND

Graphene is a crystalline form consisting of two-dimensional sheets that have the thickness of one atom of $sp^2$-hybridized carbon and a honeycomb pattern, wherein the bond energy of covalent bond between carbon atoms in the same sheet reaches 607 KJ/mol. Due to the superb bond energy, graphene has an excellent mechanical property and structural rigidity, with a tensile strength of 130 GPa and an elastic modulus of more than 1 TPa. Further, the p orbitals of the carbon atoms in the same sheet overlap with each other to form π-conjugated network, so that the weakly localized electrons can freely hop between adjacent carbon atoms in the same sheet. Therefore, graphene has a good electrical property, with a low resistivity of $10^{-6}$ Ω·cm, and becomes a kind of material having the lowest resistance at room temperature as currently known.

It becomes a topic of general interest in current scientific research to synthetize graphene-based macromaterials with the excellent properties of graphene to promote the applications of graphene in related fields. Among a variety of graphene-based macromaterials, graphene fibers are widely studied for their great potential for applications in functional plants, intelligent sensors, fibrous batteries and supercapacitors, as well as catalysts. Compared with the traditional carbon fibers obtained by carbonization of polymers, graphene fibers are formed by large graphene sheets stacked in order along the axial direction of the fibers. Therefore, the mechanical, thermal and electrical properties of the graphene fibers are expected to break the limit of traditional carbon fibers. Further, graphene oxide can be loaded with many kinds of functional substances, which makes graphene fibers promising to be a new generation of fiber materials with structural and functional properties combined.

Graphene fibers are currently mainly prepared in a wet process of liquid crystal spinning. This method includes simple procedures with good continuity. The graphene fibers prepared in this way have a diameter about 10 to 50 μm, a tensile strength of 2.2 GPa, a Young's modulus of 400 GPa, and a conductivity of $8 \times 10^5$ S m$^{-1}$, while the properties thereof are still much poorer than those of the graphene. This is due to the extrusion swell effect at the spinneret and the mismatching between the volatilization speed of the solvent and the drying speed of the graphene oxide gel fibers during the preparation, as well as the core-shell structure caused by the shear stress gradient in the radial direction of the spinning tube, all of which causes the non-axial orientation and non-close stacking of graphene oxide sheets in the fiber, thereby greatly affecting the properties of the fibers. Therefore, controlling the internal structure of the fibers, such as improving the orientation of the graphene sheets in the fibers, decreasing the spacing between the graphene sheets and reducing defects in the fiber, and so on, is the main method to improve the properties of the graphene fibers.

In order to control the internal structure of the fibers, efforts can be made to increase the size of the graphene oxide sheet while decreasing the fiber diameter, i.e., to increase the ratio of the sheet size to the fiber diameter. The ratio of the sheet size to the fiber diameter of the fiber obtained by wet spinning usually ranges from 0.2 to 2, although it can be up to 10 if super large sheets of graphene oxide (100 to 200 μm) are used. However, due to the limit of the inner diameter of the needle used in wet spinning (usually 60 to 250 μm), it is still difficult to obtain nano-scale graphene fibers, thereby hindering the improvement of the properties of the fibers.

Electrospinning is a method using a spinning solution of polymer, in which charged jets overcome the surface tension under the action of electric field force and are stretched into superfine nanofibers, which move to the substrate at a high speed, during which, the solvent in the fibers rapidly volatilizes and the solidified nanofibers are deposited on the surface of the substrate. This method includes simple procedures, with low cost and less pollution, and it is efficient to prepare polymer nanofibers. However, there are two main challenges in preparation of graphene nanofibers by electrospinning: one is the excessive surface tension and poor stretchability of the graphene oxide solution, which make the graphene oxide solution difficult to stretch into fibers; the other is the fact that, after the graphene oxide is added into the spinnable polymer solution, the polymer will severely damage the stacking of graphene sheets, resulting an extremely low content of the graphene oxide (solid content less than 5 wt %), so that the less content of graphene oxide cannot efficiently turn into graphene fibers during stretching process. Even after carbonization of the polymer, it is dominated by amorphous carbon. Therefore, it becomes a hot research topic to obtain graphene nanofibers with high strength or high conductivity by electrospinning.

SUMMARY

It is an object of the present invention to provide a nanofiber which belongs to the field of graphene materials. The nanofiber includes at least graphene sheets that are overlapped and connected one after another along an axial direction of the fiber, wherein the graphene sheets have a size ranging from 20 μm to 30 μm, and roll up in a circumferential direction so that the graphene sheets that are overlapped and connected one after another form a continuously "rolled and staggered" structure. This "rolled and staggered" structure, formed by circumferential rolling, greatly reduces the diameter of the graphene fiber, with a smallest diameter less than 200 nm.

In some cases, the fiber has a smallest diameter less than 200 nm, which is formed by rolling up a single graphene sheet.

Another object of the present invention is to provide a graphene nanofiber, which includes at least graphene sheets that are overlapped and connected one after another along an axial direction of the fiber, wherein the graphene sheets have a size ranging from 20 μm to 30 μm, and roll up in a circumferential direction so that the graphene sheets that are overlapped and connected one after another form a "rolled and staggered" structure. This "rolled and staggered" structure, formed by circumferential rolling, greatly improves the mechanical property of the fiber. The resulted fiber has a maximum tensile strength of 10.2 GPa and an ultimate elongation of 0.93%. On the one hand, according to Griffith's theory of fracture ($\sigma \sim D^{-1/2}$), the smaller the diameter of the fiber is, the greater the strength will be. This is because the fiber having a small diameter has fewer microcracks and defects, while the basic components (graphene sheets) are more regularly oriented in the axial direction, so that the stress concentration in the fiber is greatly reduced. On the other hand, the "rolled and staggered" structure, formed by circumferential rolling, allows the graphene sheets to be arranged closely, which greatly improves the mechanical property of the fiber. Further, the fracture of the broken graphene fiber with the "rolled and staggered" structure, formed by circumferential rolling, is not flat, showing typical ductile fracture characteristics, which proves that the fiber is broken based on an interfacial slipping mechanism of the graphene sheets. Therefore, the breaking strength of the fiber is greater than that of micron-sized fiber which is broken up based on the crack propagation mechanism.

An object of the present invention is to provide a graphene nanofiber, which includes graphene sheets that are overlapped and connected one after another along an axial direction of the fiber, wherein the graphene sheets have a size ranging from 20 μm to 30 μm, and rolled up in a circumferential direction so that the graphene sheets that are overlapped and connected one after another form a "rolled and staggered" structure. This "rolled and staggered" structure, formed by circumferential rolling, allows the ratio of the sheet size to the fiber diameter of the fiber to reach more than 100, i.e. the size of the graphene sheet is 100 times of the diameter of the fiber, so that the graphene sheets of the fiber have fewer defects at the edges thereof. Therefore, less electron scattering is resulted relative to the graphene microfiber and carbon fiber prepared by wet spinning, so that the electron transport ability of the graphene nanofiber is greatly improved. The conductivity of the graphene nanofiber after thermal treatment can reach $2.7 \times 10^6$ S m$^{-1}$.

Another object of the present invention is to provide a method for preparing a graphene fiber having the above structure. In this method, graphene oxide with a size of 20-30 μm is mixed with a polymer to form a mixed spinning solution with a ultra-high draw ratio. The mixed spinning solution is electrospun to obtain a nano-fiber, with sheets rolled in a circumferential direction and overlapped and connected one after another along an axial direction. Under the electric field force, the spinning solution at the outlet of the injection needle forms a Taylor cone and is gradually stretched to be thinner, and moves to the negative high-voltage collecting device. In this process, the graphene oxide sheets (20-30 μm) in the solution gradually move from disorder to order, and the graphene oxide sheets in the jet are circumferentially rolled into a cylinder. As the jet is further accelerated, the rolled graphene oxide sheets slip axially, and the diameter of the jet can eventually reach the size of nanometer. During the high-speed flight, the moisture in the polymer-graphene oxide nanofiber rapidly volatilizes, remaining the rolled and continually overlapped and connected structure of the graphene oxide. The fiber, stretched at a high speed in the electrospinning method, has a terminal velocity of more than 1.5 m/s, and has no more than 20 ea graphene oxide sheets or even only a single graphene oxide sheet when seen from the cross section direction of the fiber, thereby improving the orientation of the sheets and reducing defects and wrinkles in the fiber.

Specifically, the method described above includes the following steps:

(1) preparing a mixed spinning solution with a ultra-high draw ratio using polyacrylate sodium (PAAS) and graphene oxide, wherein the ultra-high draw ratio means that the solution can be stretched to a length being 20 times or more of the initial length thereof. The graphene oxide (GO) in the spinning solution has sheets with a size ranging from 20 μm to 30 μm and a concentration ranging from 0.5 wt % to 1.2 wt %. The surface tension of polymer-free graphene oxide solution in an aqueous medium (or DMF, DMAc, etc.) is high and up to 70 mN/m. In contrast, the surface tension of the mixed spinning solution is significantly reduced (as low as 24 mN/m). Further, when the solution is stretched into microfiber, the viscoelastic property of the polymer solution prevents an early fracture of the solution due to high surface tension; and (2) electrospinning the mixed spinning solution prepared in step (1) to obtain the nanofiber. Under the electric field force, the spinning solution at the outlet of the injection needle forms a Taylor cone and is gradually stretched to be thinner, and moves to the negative high-voltage collecting device. In this process, the graphene oxide sheets in the solution gradually move from disorder to order, and the orientation is improved as the diameter of the fiber becomes smaller. Due to the restriction of the diameter of the thinned jet, the graphene oxide sheets are rolled up and the adjacent sheets are sliding to each other, so that the number of sheets of the jet is reduced to less than 20 when seen from the diameter direction. Even more, the jet may be formed from a single graphene sheet rolled in the circumferential direction when seen from the diameter direction.

In some embodiments, the spinning voltage is 15 kV and the distance between the spinning tip and the collecting device is 20 cm.

In some embodiments, the extrusion speed of the spinning solution is 0.08 mm/min.

In some embodiments, the spinning temperature ranges from 30° C. to 50° C., and the ambient humidity is less than 30%.

In some embodiments, the method further includes chemically reducing the nanofibers to obtain reduced graphene oxide nanocomposite fibers.

In some embodiments, the chemical reduction method is fumigation at 95° C. for 12 hours using hydriodic acid.

In some embodiments, the method further includes subjecting the chemically reduced composite fiber to a thermal treatment to remove the polymer therein, and fix the defects of the graphene to obtain pure graphene nanofibers. The thermal treatment method is performed in inert atmosphere at 1000° C. and 2800° C. for 1 hour.

In the above embodiments, the chemical reduction only removes the oxygen-containing functional groups, without changing the morphology and size of the fiber. A two-step thermal reduction of low-temperature and high-temperature after the chemical reduction removing the oxygen-containing functional groups can fix the defects on the surface of the fiber, and maintain the structure of the rolled and overlapped and connected graphene sheets.

It has already been known in the art to use a copper mesh as the collecting device for obtaining a non-woven fabric made from the ultrafine graphene nanofibers. Compared with the non-woven fabric made from polypropylene resin which serves as the main raw material, the non-woven fabric made from graphene nanofibers is more environmentally friendly, with a tensile strength of 110 kPa, an ultimate elongation of 6.4%, and a conductivity of $3.18 \times 10^3$ S m$^{-1}$. Therefore, the non-woven fabric made from graphene nanofiber can also be used as a carrier of various functional materials, and has a wide application prospect in the fields of energy, catalysis, intelligent sensor and so on. Further, the graphene oxide, which has not been subjected to the thermal treatment, has a lot of functional groups on the surface thereof, which is favorable for loading various functional nanoparticles, thereby expanding the application of the nanofiber non-woven fabric.

In some preferred embodiments, the electrospinnable polymer-graphene oxide spinning solution may be prepared using the following steps:
(1) preparing graphene oxide solution and polymer solution, respectively; and
(2) uniformly mixing the two solutions in step (1) to obtain a mixed polymer-graphene oxide spinning solution having a ultra-high draw ratio.

The solvent for the polymer and the solvent for the graphene oxide in step (1) are usually water.

In the present invention, the draw ratio of the solution is tested using the following method: placing two glass columns in vertical direction which have smooth surfaces and the same diameter, with an initial distance therebetween being $d_e$-$d_0$=3 mm, filling a spinning solution between the two glass columns, pulling the upper glass column upwardly so that the filled spinning solution will be stretched and becomes thinner and straight until it is broken up. During the tension, the tensile rate is fixed at 300 mm/min. When the fluid is broken up, the distance between the two glass columns is $d_t$-$d_0$. The draw ratio of the solution then can be calculated by $$\lambda = \frac{d_t - d_e}{d_e - d_o} \times 100\%.$$

The draw ratio of the solution reflects the spinnability of the solution under the electric field force.

In the present invention, the draw ratio of the mixed spinning solution with the graphene oxide and sodium polyacrylate combined in a specific ratio can be more than 2500%. The specific ratio refers to that the ratio of the solid content of the graphene oxide and the solid content of the sodium polyacrylate is 1:1 (that is, the graphene oxide occupies 50 wt %), and the mass fraction of the graphene oxide in the mixed spinning solution is 0.5-1.2 wt %, in order to ensure proper surface tension of the spinning solution. In step (1), the size of the graphene oxide (GO) sheet ranges from 20 μm to 30 μm. The spinning solution with proper surface tension can be electrospun to form fibers which are rolled in the circumferential direction and oriented and overlapped and connected continuously in the axial direction.

It is also an object of the present invention to obtain other graphene materials consisting of nano-graphene fibers by electrospinning, including graphene nano-fiber bundle, graphene nano-fiber aerogel, highly oriented nano fiber non-woven fabric and the like.

Specifically, the electrospinnable polymer-graphene oxide solution is used as a precursor for electrospinning, and the shape, conductivity, motion mode, rotating speed and so on of the collecting device are changed so as to obtain macroscopic materials of graphene nanofibers with different morphologies.

In some preferred embodiments, the electrospinnable polymer-graphene oxide solution prepared as described above can be used to prepare the ultra-fine graphene nanofibers (or non-woven fabrics) through the following steps:
(1) extruding the spinning solution at a speed of 0.08 mm/min, wherein the size of the stainless steel needle of syringe is 21 #, and a positive high voltage of 15 kV is applied to the needle; two iron wires (or a copper mesh) that are horizontally placed at 20 cm right below the needle are used as the collecting device and grounded;
(2) removing the graphene oxide nanofibers (or non-woven fabrics) from the surface of the collecting device and placing them in a vacuum oven at 60° C. overnight, and then fumigating them with hydroiodic acid vapor at 95° C. for 12 hours; and
(3) subjecting the chemically reduced graphene oxide nanofibers (or non-woven fabrics) to a thermal treatment of 1000° C. and 2800° C. for 1 hour in an inert atmosphere to obtain pure graphene nanofibers (or non-woven fabrics).

In the present invention, graphene is a general term, which is equivalent to a graphene material, and includes pure graphene, graphene oxide, partially reduced graphene oxide, and the like.

The beneficial effects of the present invention are: the graphene sheets are circumferentially rolled up, and overlapped and connected one after another to form a "rolled and staggered" structure, thereby greatly reducing the diameter of graphene fibers, which is important for obtaining high-strength graphene fibers or highly conductive graphene fibers. The present invention also provides a method for preparing the above-mentioned graphene fibers having a rolled structure by electrospinning a polymer-graphene oxide mixed spinning solution (the polymer is sodium polyacrylate).

BRIEF DESCRIPTION OF THE DRAWINGS

FIGS. 12a and 12b show the nanofiber after chemical reduction and the nanofiber after thermal treatment in embodiment 4, respectively.

FIGS. 13a and 13b show the nanofiber after chemical reduction and the nanofiber after thermal treatment in embodiment 5, respectively.

FIG. 14 shows dotted particles obtained by spinning in comparative example 2.

DESCRIPTION OF THE EMBODIMENTS

Hereinafter, that present invention will be specifically described with reference to the drawings and embodiments.

In the following embodiments and comparative examples, the polymer used includes:

sodium polyacrylate, Shanghai Yuanye Bio-Technology Co., Ltd., molecular weight $M_w$=30 million.

In the following embodiments and comparative examples, the graphene oxides used include:

graphene oxide solution, HANGZHOU GAOXI TECHNOLOGY Co., Ltd., with transverse sizes distributed between 20 μm and 30 μm, single layer ratio of over 99%, and oxygen content of 30%-40%; and graphene oxide solution, GAOCHAO Research Group of Polymer Department, ZHEJIANG UNIVERSITY, with transverse sizes distributed between 100 μm and 200 μm, single layer ratio of over 99%, and oxygen content of 30%-40%.

Those skilled in the art will know that: 1) chemical reduction only removes the oxygen-containing functional groups, without changing the morphology and size of the fibers; 2) the two-step thermal reduction of low-temperature and high-temperature after the chemical reduction removing the oxygen-containing functional groups can fix the defects on the surface of the fiber, and maintain the structure of the rolled, overlapped and connected graphene sheets.

Figure 15:
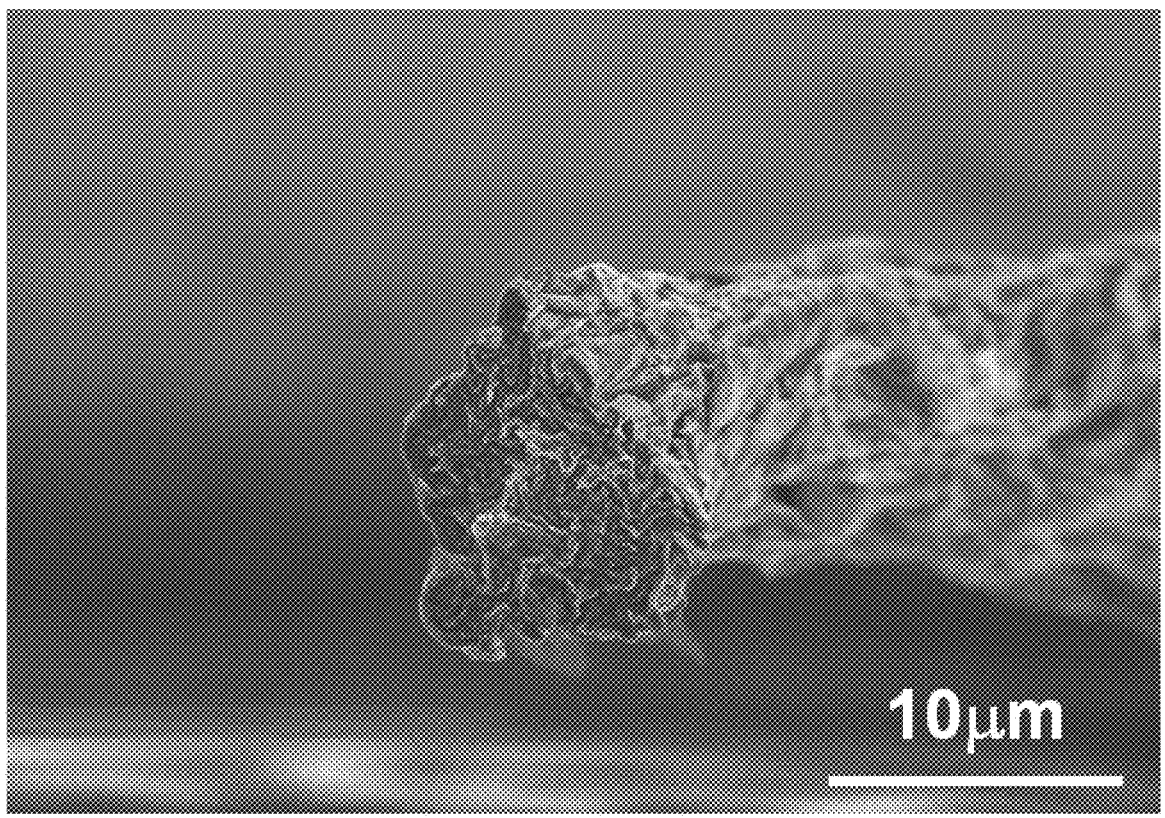
FIG. 15 shows the SEM image of the cross section of a micron-scale fiber obtained by wet spinning.

In addition, in the following embodiments, unlike the fiber obtained after the thermal reduction which has a jagged section after breaking up, the fiber obtained after chemical reduction has no jagged section. This is because the polymer is still remained in the fiber which hasn't been subjected to the thermal treatment and a large amount of oxygen-containing functional groups are still remained on the surfaces of the sheets, and the sheets roll up at the breaking point to wrap the fracture surface under the high-energy electron beam of SEM. After thermal treatment, the sodium polyacrylate and the oxygen-containing functional groups are removed, so that the fiber is more excellent in conductivity. The jagged section results from the rigidity of graphene sheets after thermal treatment. It also indicates that the ultra-fine graphene nanofiber is broken up based on a ductile fracture mechanism caused by graphene interfacial slipping. In contrast, the cross section at the breaking point of the micron-sized graphene fiber which is thicker and obtained after thermal treatment at 1000° C. and 2800° C. for 1 hour in an inert atmosphere is flat (see FIG. 15), which indicates that this fiber is broken up based on a brittle fracture mechanism.

Embodiment 1

(1) An aqueous solution of graphene oxide at a concentration of 1 wt % and an aqueous solution of sodium polyacrylate at a concentration of 2.33 wt % are prepared, respectively, wherein the sizes of the graphene oxide (GO) sheets are distributed from 20 μm to 30 μm, and the average size is about 25 μm.

(2) The two aqueous solutions are mixed in a mass ratio of 1:1 (that is, the graphene occupies 30 wt %) and homogenized by a homogenizer to obtain a mixed spinning solution of sodium polyacrylate and graphene oxide, and the draw ratio of the spinning solution at 25° C. is 3900%.

Figure 1:
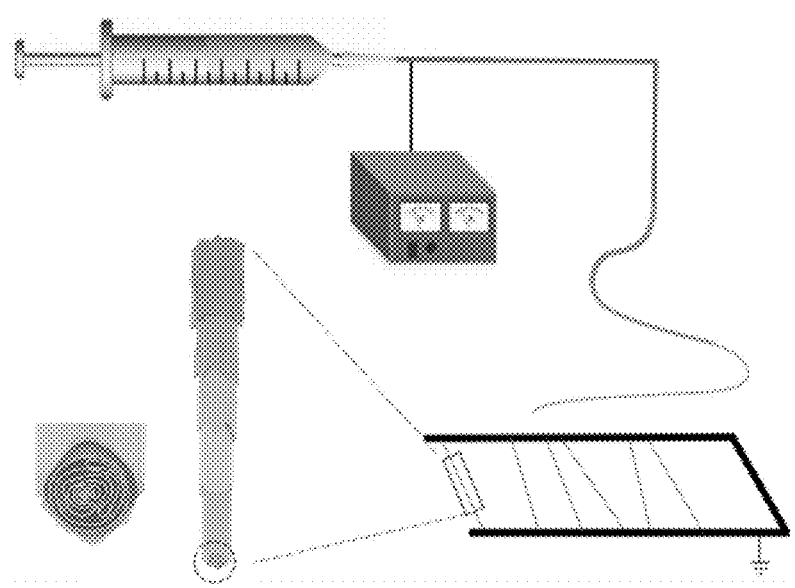
FIG. 1 shows an electrospinning device of the present invention and a structure of a graphene nanofiber which is rolled by graphene sheets in a circumferential direction. The oriented graphene sheets are overlapped and connected continuously in an axial direction.
Figure 2:
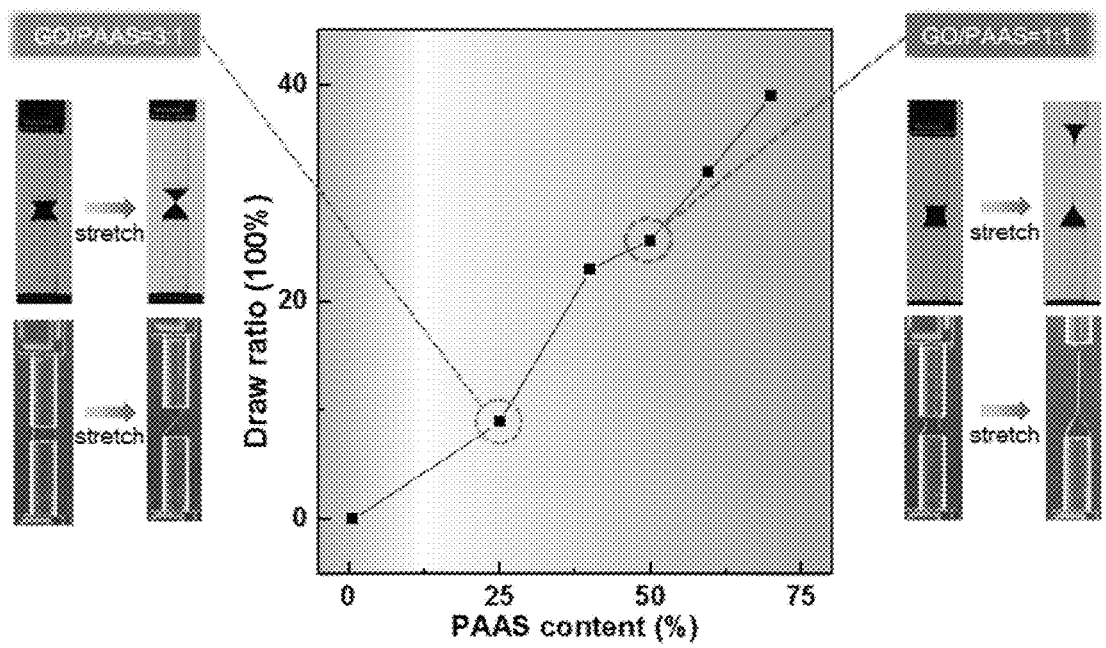
FIG. 2 shows measured drawing ratios of spinning solutions of graphene oxide and sodium polyacrylate at different ratios, and the sides are the corresponding polarizing optical micrographs and actual photos of the drawing process of the spinning solutions.
Figure 3:
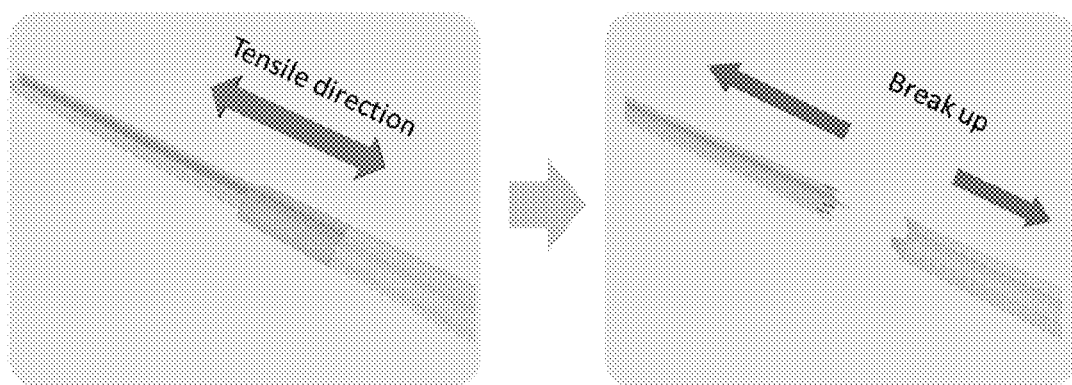
FIG. 3 shows the schematic of fracture process.
Figure 4:
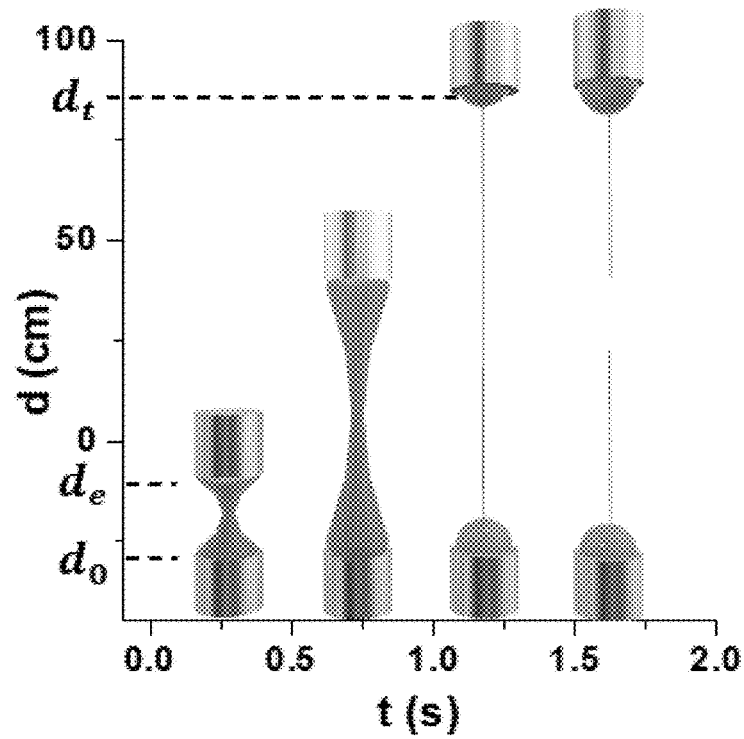
FIG. 4 shows the process for testing the drawing ratio of the solution.

(3) The spinning solution is sucked into a 10 ml syringe, with the needle (21 #) of the syringe supplied with a positive high voltage of 15 kV, and extruded from the needle at a uniform speed of 0.08 mm/min. Two horizontally placed iron wires are used as the collecting device at 20 cm right below the needle and grounded (as shown in FIG. 1).

Figure 5A:
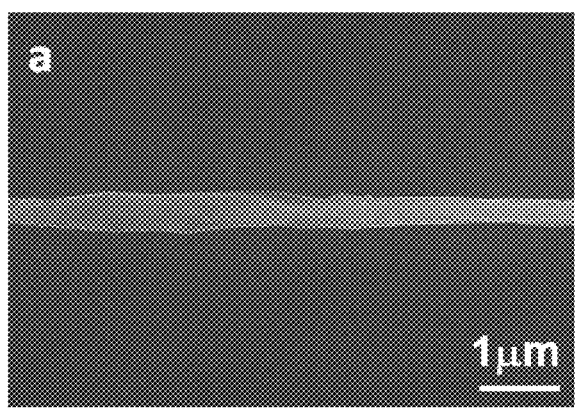
FIGS. 5a and 5b show SEM images of the surface and cross section of the fiber according to embodiment 1, respectively.
Figure 5B:
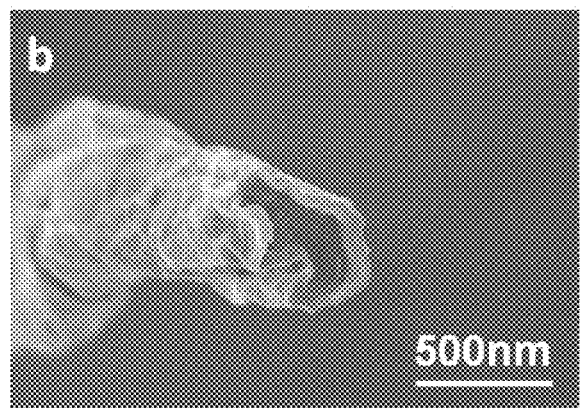

(4) The fibers are removed from the two iron wires, and fumigated at 95° C. for 12 hours with hydroiodic acid to obtain chemically reduced graphene nanofibers. FIGS. 5a and 5b show the SEM morphologies of the surface and cross section of the obtained chemically reduced graphene nanofiber, respectively, wherein the image of the cross section shows that the fiber has a structure in which the sheets are rolled in the circumferential direction.

Figure 6:
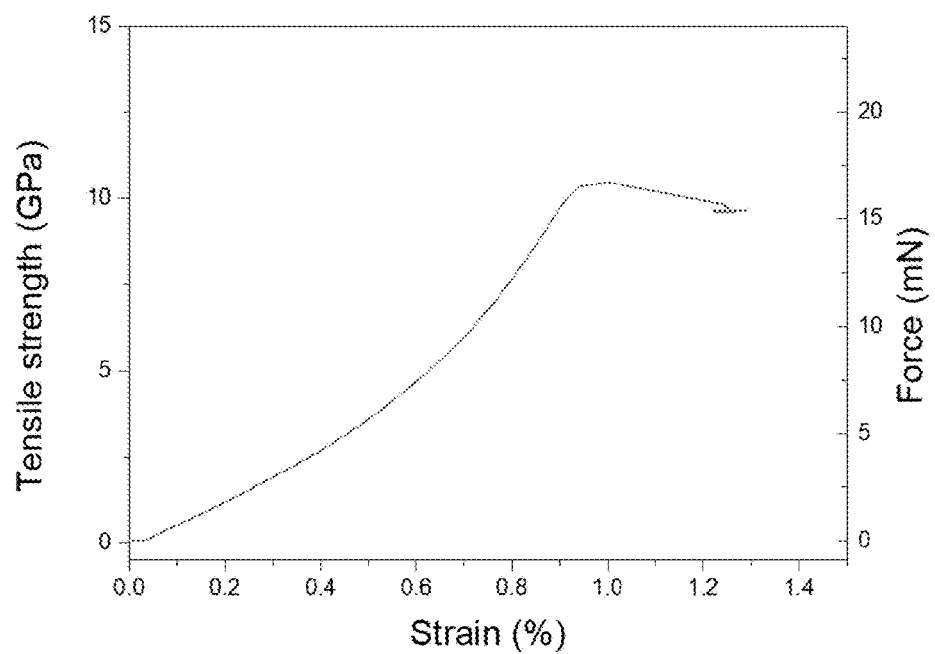
FIG. 6 shows the tensile strength of the chemically reduced nanofibers obtained in embodiment 2. It can be seen from this figure that the nanofibers have good tensile strength, with tensile strength of 10.2 GPa and ultimate elongation of 0.93%.
Figure 7A:
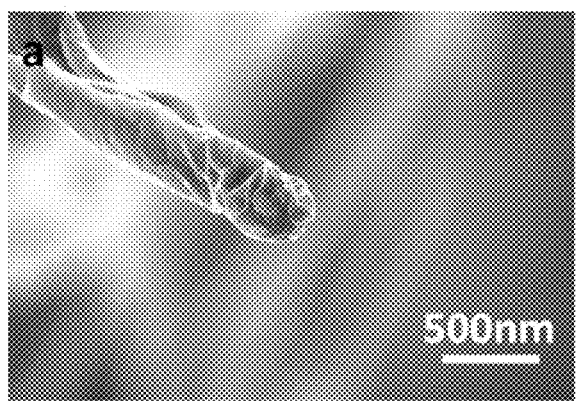
FIGS. 7a and 7b show SEM images of the fiber fracture obtained in embodiment 1 after chemical reduction and after thermal treatment, respectively.

(5) The tensile strength of the chemically reduced nanofiber is tested by means of uniaxial tension with a high-precision tensile testing machine. The tensile strength of the nanofiber is 10.2 GPa and the ultimate elongation is 0.93% (as shown in FIG. 6). The SEM image of the fiber after broken up is shown in FIG. 7a.

Figure 7B:
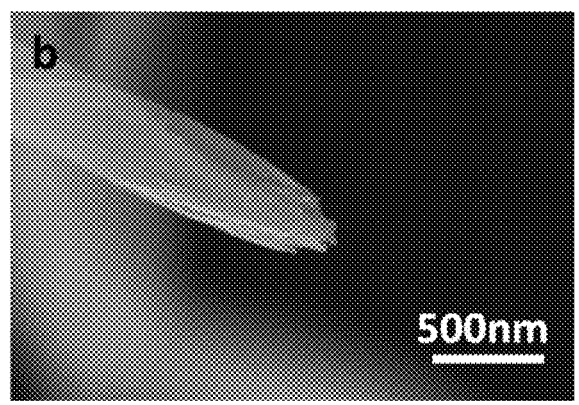

(6) The nanofibers which are chemically reduced by fumigating with hydroiodic acid at 95° C. for 12 hours are subjected to a thermal treatment of 1000° C. and 2800° C. at an inert atmosphere in turn for 1 hour. FIG. 7b shows a fracture surface of the obtained nanofiber. It can be seen that jagged graphene sheets present at the fracture of the broken fiber, and the fiber has graphene sheets that are rolled in the circumferential direction. The electrical conductivity of the thermal treated graphene nanofiber is measured through a four-point probe method, and the electrical conductivity is $1.1 \times 10^6$ S m$^{-1}$.

In the present embodiment, the average diameter of the fiber is 290 nm, the average size of the graphene sheets is 25 μm, the cross-sectional area of the fiber is 0.066 μm$^2$, and the space between adjacent graphene sheets is 0.37 nm. Therefore, the number of the graphene sheets is 0.066/(25×0.37×10$^{-3}$)≈7. That is, the graphene nanofiber is formed by 7 graphene sheets rolled in the circumferential direction as viewed from the cross-sectional direction.

Embodiment 2

(1) an aqueous solution of graphene oxide at a concentration of 2 wt % and an aqueous solution of sodium polyacrylate at a concentration of 2 wt % are prepared, respectively, wherein the sizes of the graphene oxide (GO) sheets are distributed from 20 μm to 30 μm, and the average size is about 25 μm.

(2) The two aqueous solutions are mixed in a mass ratio of 1:1 (that is, the graphene occupies 50 wt %) and homogenized by a homogenizer to obtain a mixed spinning solution of sodium polyacrylate and graphene oxide, and the draw ratio of the spinning solution at 25° C. is 2500%.

(3) The spinning solution is sucked into a 10 ml syringe, with the needle (21 #) of the syringe supplied with a positive high voltage of 15 kV, and extruded from the needle at a uniform speed of 0.08 mm min$^{-1}$. A horizontally placed copper mesh is used as the collecting device at 20 cm right below the needle and grounded. After several hours, a non-woven fabric of graphene oxide nanofibers can be collected on the surface of the copper mesh.

Figure 8A:
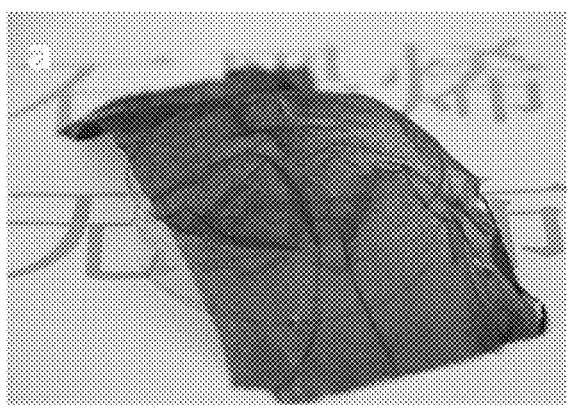
FIG. 8a shows the photograph of the non-woven fabric.
Figure 8B:
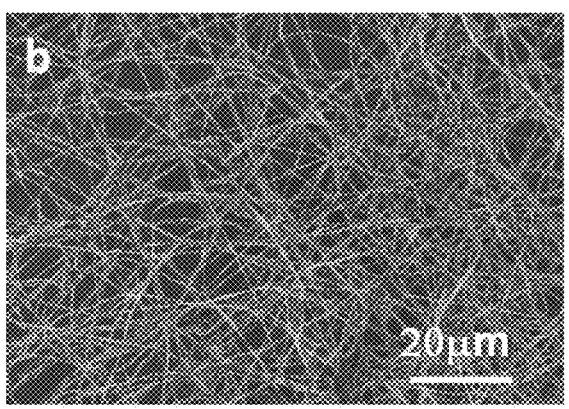
FIG. 8b shows SEM image of the non-woven fabric.
Figure 8C:
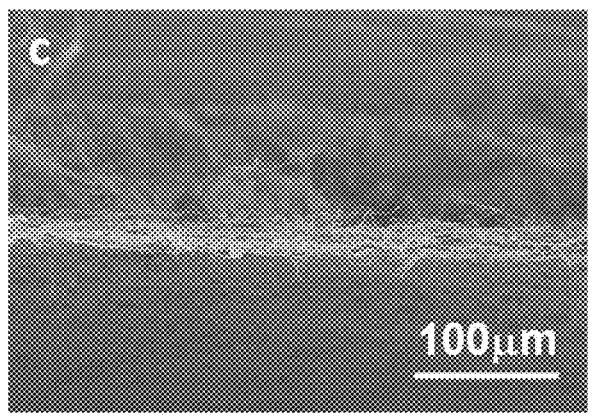
FIG. 8c shows cross section of the non-woven fabric.
Figure 8D:
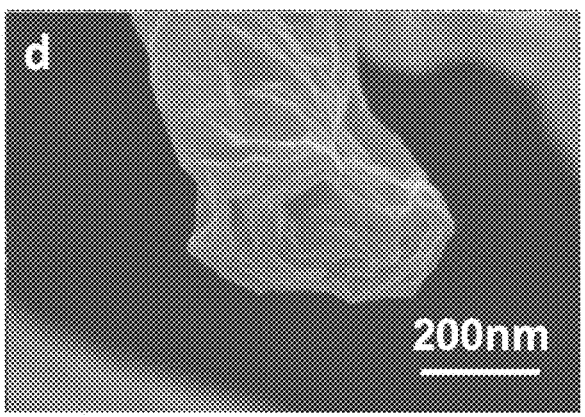
FIG. 8d shows cross section of a single fiber, wherein the cross section of non-woven fabric is cut with a blade.
Figure 9:
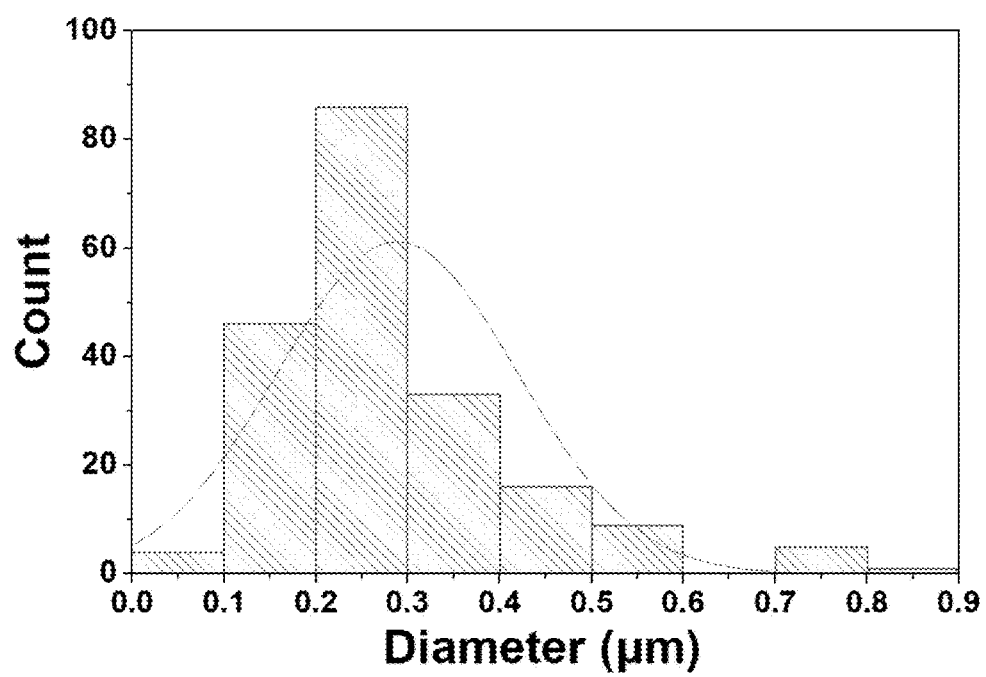
FIG. 9 shows the distribution of fiber diameter, and it is shown that the diameters in the range of 100 to 500 nm occupy more than 90%.

(4) The above non-woven fabric of graphene oxide nanofibers is fumigated at 95° C. for 12 hours with hydroiodic acid, and then placed in a vacuum oven at 60° C. overnight. As shown in FIGS. 8a to 8c, the obtained non-woven fabric of graphene nanofibers is formed by randomly distributed nanofibers of the embodiment 1, and the fiber diameters are distributed from 100 nm to 500 nm. As can be seen from FIG. 8d, the graphene oxide nanosheets are rolled in the circumferential direction.

Figure 10:
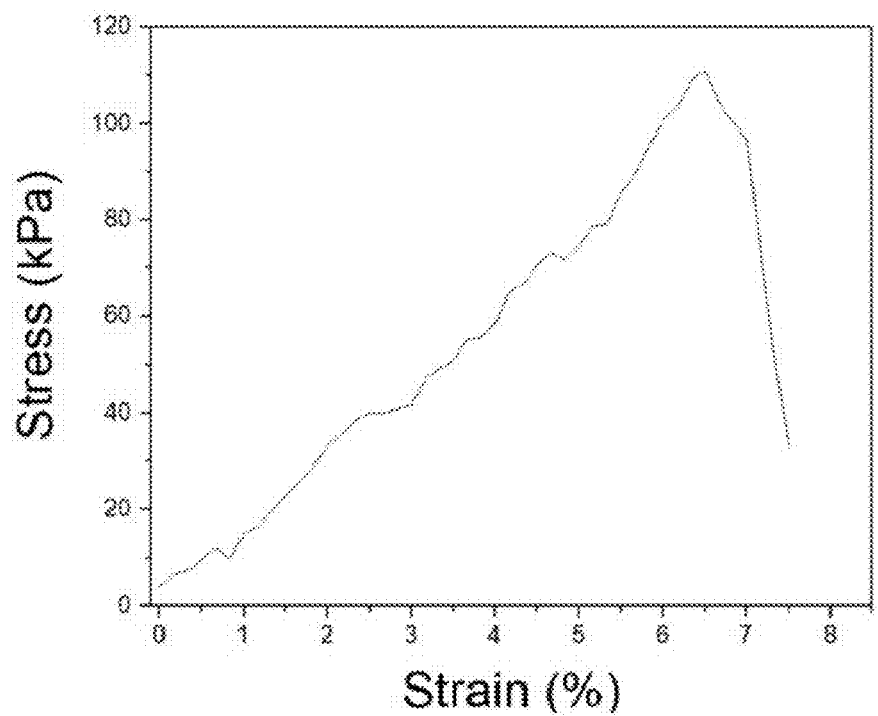
FIG. 10 shows the tensile strength of the graphene nanofiber non-woven fabric obtained in embodiment 1. It can be seen that the tensile strength of the obtained graphene nanofiber non-woven fabric is 110 kPa, and the ultimate elongation is 6.4%.

(5) The obtained non-woven fabric is subjected to thermal treatment of 1000° C. and 2800° C. in turn for 1 hour in an inert atmosphere in order to obtain a non-woven fabric composed of pure graphene nanofibers. The tensile strength of graphene non-woven fabric is tested by uniaxial tension with a high-precision tensile testing machine. The tensile strength is 110 kPa and the ultimate elongation is 6.4% (as shown in FIG. 10). The electrical conductivity in-plane of graphene non-woven fabric is measured through a four-point probe method and reaches $3.18 \times 10^3$ S m$^{-1}$. Its density is estimated to be 180 mg cm$^{-3}$.

Embodiment 3

(1) An aqueous solution of graphene oxide at a concentration of 2.4 wt % and an aqueous solution of sodium polyacrylate at a concentration of 1.6 wt % are prepared, respectively, wherein the sizes of the graphene oxide (GO) sheets are distributed from 20 μm to 30 μm, and the average size is about 25 μm.

(2) Graphene oxide and sodium polyacrylate with the mass ratio of 1:1 are taken and dispersed in water to form a mixed solution, and the draw ratio of the spinning solution at 25° C. is 3150%.

(2) The spinning solution is sucked into a 10 ml syringe, with the needle (21 #) of the syringe supplied with a positive high voltage of 18 kV, and extruded from the needle at a uniform speed of 0.1 mm/min. A horizontally placed copper mesh is used as a collecting device at 20 cm right below the needle and grounded. After several hours, a non-woven fabric of graphene oxide nanofibers can be collected on the surface of the copper mesh.

Figure 11A:
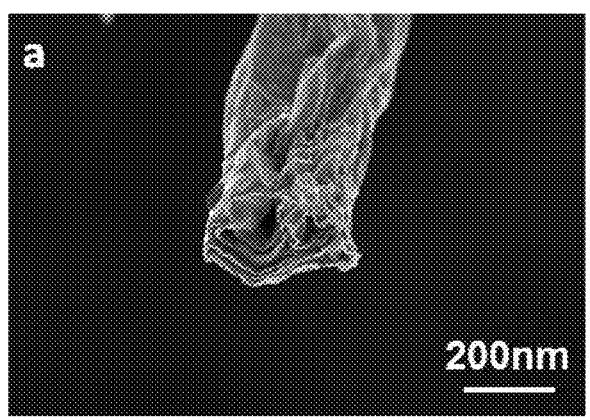
FIGS. 11a and 11b show the nanofiber after chemical reduction and the nanofiber after thermal treatment in embodiment 3, respectively.

(3) The above non-woven fabric of graphene oxide nanofibers is fumigated at 95° C. for 12 hours with hydroiodic acid, and then placed in a vacuum oven at 60° C. overnight. FIG. 11a shows a fracture surface of the separated reduced graphene oxide fiber. It can be seen that the graphene oxide nanosheets are rolled up circumferentially.

Figure 11B:
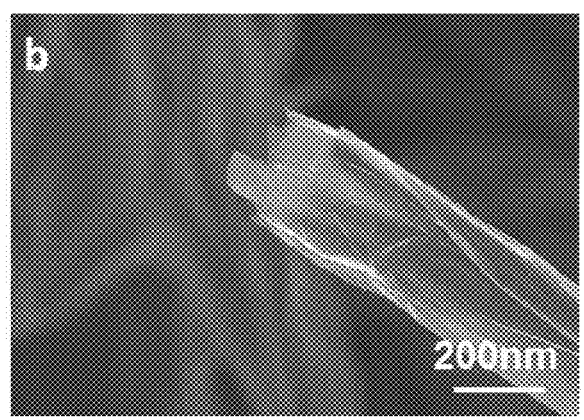

(4) The obtained non-woven fabric is subjected to thermal treatment of 1000° C. and 2800° C. in turn for 1 hour in an inert atmosphere in order to obtain a non-woven fabric composed of pure graphene nanofibers. FIG. 11b shows a fracture surface of the obtained reduced graphene oxide fiber. It can be seen that jagged graphene sheets present at the fracture of the broken fiber, and the fiber has sheets that are rolled in the circumferential direction.

It is also found by SEM that the non-woven fabric is formed by randomly overlapped graphene nanofibers, with diameters of fibers ranging from 100 nm to 440 nm and average diameter of 250 nm. The tensile strength of non-woven fabric is tested by uniaxial tension with a high-precision tensile testing machine. The tensile strength is 40 kPa and the ultimate elongation is 7.8%. The electrical conductivity in-plane of graphene non-woven fabric is measured through a four-point probe method and reaches $1.89 \times 10^3$ S m$^{-1}$. Its density is estimated to be 155 mg cm$^{-1}$.

Embodiment 4

(1) This step is similar to that of Embodiment 3, the difference therebetween is that two horizontally placed iron wires are used as the collecting device at 20 cm right below the needle and grounded (as shown in FIG. 1).

(2) The fibers between the two iron wires are removed and fumigated with hydroiodic acid at 95° C. for 12 hours to obtain chemically reduced graphene nanofibers having a diameter of about 255 nm. The fracture surface of the nanofiber is shown in FIG. 12a. The tensile strength of the chemically reduced fiber is tested by means of uniaxial tension with a high-precision tensile testing machine. The tensile strength of the nanofiber is 1.6 GPa and the ultimate elongation is 1.49%.

(3) The nanofibers which are chemically reduced by fumigating with hydroiodic acid at 95° C. for 12 hours are subjected to thermal treatment of 1000° C. and 2800° C. at an inert atmosphere in turn for 1 hour. FIG. 12b shows the obtained nanofiber. It can be seen that jagged graphene sheets present at the fracture of the broken fiber, and the fiber has sheets that are rolled in the circumferential direction. The electrical conductivity of the thermal treated graphene nanofibers is measured through a four-point probe method, and the electrical conductivity is $1.5 \times 10^{-5}$ S m$^{-1}$.

In the present embodiment, the average diameter of the fibers is 255 nm, the average size of the graphene sheets is 25 μm, the cross-sectional area of the fiber is 0.049 μm$^2$, and the space between adjacent graphene sheets is 0.37 nm. Therefore, the number of the graphene sheets is $0.051/(25 \times 0.37 \times 10^{-3}) \approx 5$. That is, the graphene nanofiber is formed by 5 graphene sheets rolled in the circumferential direction as viewed from the cross-sectional direction.

Embodiment 5

(1) An aqueous solution of graphene oxide at a concentration of 1 wt % and an aqueous solution of sodium polyacrylate at a concentration of 2.33 wt % are prepared, respectively, wherein the sizes of the graphene oxide (GO) sheets are distributed from 20 μm to 30 μm, and the average size is about 25 μm.

(2) The two aqueous solutions are mixed in a mas ratio of 1:1 (that is, the graphene occupies 30 wt %) and homogenized by a homogenizer to obtain a mixed spinning solution of sodium polyacrylate and graphene oxide, and the draw ratio of the spinning solution at 25° C. is 3900%.

(3) The spinning solution is sucked into a 10 ml syringe, with the needle (21 #) of the syringe supplied with a positive high voltage of 25 k, and extruded from the needle at a uniform speed of 0.08 mm min$^{-1}$. Two horizontally placed iron wires are used as a collecting device at 20 cm right below the needle and grounded (as shown in FIG. 1).

(4) The fibers are removed from the two iron wires, and fumigated at 95° C. for 12 hours with hydroiodic acid to obtain chemically reduced graphene nanofibers. FIG. 13a shows the cross section of the obtained chemically reduced graphene nanofiber. The tensile strength of the chemically reduced nanofiber is tested by means of uniaxial tension with a high-precision tensile testing machine. The tensile strength of the nanofiber is 0.7 GPa and the ultimate elongation was 0.55%.

(3) The nanofibers which are chemically reduced are subjected to thermal treatment of 1000° C. and 2800° C. at an inert atmosphere in turn for 1 hour. FIG. 13b shows the obtained graphene nanofiber. It can be seen that jagged graphene sheets present at the fracture of the broken fiber, the fiber has sheets that are rolled in the circumferential direction, and its size is substantially the same as that of the fiber before thermal treatment (FIG. 13a). The electrical conductivity of the thermal treated graphene nanofibers is measured through a four-point probe method, and the electrical conductivity is $2.7 \times 10^6$ S m$^{-1}$.

In the present embodiment, the average diameter of the fibers is 120 nm, the average size of the graphene sheets is 25 μm, the cross-sectional area of the fiber is 0.0113 μm$^2$, and the space between adjacent graphene sheets is 0.37 nm. Therefore, the number of the graphene sheets is $0.0113/(25 \times 0.37 \times 10^{-3}) \approx 1$. That is, the graphene nanofiber is rolled by 1 graphene sheet in the circumferential direction as viewed from the cross-sectional direction.

Comparative Example 1

Comparative Example 1 is similar to Embodiment 1, and Comparative Example 1 differs from Embodiment 1 in that the graphene oxide having a size of 100 μm to 200 μm is used, the draw ratio of the spinning solution at 25° C. is determined to be 2200%. After the same spinning process as in Embodiment 1, it is found that the yield of the collected non-woven fabric is greatly reduced, which indicates that, although a sufficient draw ratio is provided, it is difficult for oversized graphene sheets (no less than 100 μm, i.e., the ratio of the sheet size to the fiber diameter is no less than 200) to roll along the circumferential direction into nanofibers by drawing a jet in the process of electrospinning, and the phase separation between polymer and graphene occurs in the fiber.

Comparative Example 2

Comparative example 2 is similar to Embodiment 1, and Comparative Example 2 differs from Embodiment 1 in that the mass ratio of the graphene oxide aqueous solution to the sodium polyacrylate aqueous solution is 3:1 (that is, the proportion of sodium polyacrylate in the mixed solution is 25 wt %), and the drawing ratio of the spinning solution at 25° C. is determined to be 900/o. After the same spinning process as in Embodiment 2, it is found that fibers cannot be collected on the copper mesh, but only dotted particles are formed (see FIG. 14). This result indicates that the graphene oxide spinning solution with a high solid content ratio has a low draw ratio, and the spinning jet cannot be drawn and refined under the action of electric field force. However, jet relaxation will happen.

Comparative Example 3

Comparative example 3 is similar to Embodiment 1, and Comparative Example 3 differs from Embodiment 1 in that the mass ratio of the graphene oxide aqueous solution to the sodium polyacrylate is 3:7 (that is, the sodium polyacrylate occupies 70 wt %), and the drawing ratio of the spinning solution at 25° C. is determined to be 4000%. After the same spinning and post-treatment as in Embodiment 1, it is found that the resulted non-woven fabric disappears after the thermal treatment, which indicates that, although an increased draw ratio can be provided by sodium polyacrylate with a higher content, graphene nanofiber cannot be obtained since the proportion of graphene oxide in the fiber is too small, so that the adjacent graphene sheets are not overlapped and connected after the thermal treatment.

What is claimed is:

1. A preparation method for a nano-fiber, comprising steps of:
   (1): preparing a mixed spinning solution with an ultra-high draw ratio using sodium polyacrylate and graphene oxide, wherein the ultra-high draw ratio is a draw ratio of no less than 2000%, the graphene oxide (GO) in the spinning solution has sheets with sizes ranging from 20 μm to 30 μm and a concentration ranging from 0.5 wt % to 1.2 wt %, and a mass fraction ranging from 30% to 60% relative to a total mass of the sodium polyacrylate and the graphene oxide; and
   (2): electrospinning the mixed spinning solution prepared in step (1) to obtain a graphene oxide-sodium polyacrylate composite nanofiber, wherein the graphene oxide sheets in the composite nanofiber are overlapped and connected one after another along an axial direction of the fiber, and roll in a circumferential direction.

2. The preparation method of claim 1, further comprising step of:
   chemically reducing the composite nanofiber obtained in step (2) to obtain a reduced graphene oxide-sodium polyacrylate composite nanofiber.

3. The preparation method of claim 2, further comprising step of:
   subjecting the chemically reduced graphene oxide-sodium polyacrylate composite nanofiber to a two-step thermal treatment to obtain a pure graphene fiber.

4. The preparation method of claim 1, wherein a mass ratio of the sodium polyacrylate (PAAS) to the graphene oxide in step (1) is 1:1.

5. The preparation method of claim 2, wherein the step of chemically reducing is fumigating at 95° C. for 12 hours using hydroiodic acid.

6. The preparation method of claim 3, wherein the thermal treatment is conducted in an inert atmosphere of 1000° C. and 2800° C. in turn for 1 hour.

\* \* \* \* \*